(12) United States Patent
Berger et al.

(10) Patent No.: US 6,294,980 B1
(45) Date of Patent: *Sep. 25, 2001

(54) TRANSPONDER WITH A FREQUENCY DETECTOR FOR PROTECTION OF SECURITY-RELATED DATA DURING CONTACTLESS INDUCTIVE COMMUNICATION, AND AN INTEGRATED CIRCUIT THEREFOR

(75) Inventors: Dominik J. Berger; Wolfgang Eber, both of Graz (AT)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,366

(22) Filed: Apr. 17, 1998

(30) Foreign Application Priority Data

Apr. 24, 1997 (EP) .................................................. 97890075

(51) Int. Cl.[7] .................................................. G05B 19/02
(52) U.S. Cl. ................. 340/10.1; 340/10.3; 340/825.64; 370/212; 370/242; 455/343; 455/31
(58) Field of Search ........................ 340/825.54, 870.31, 340/825.63, 825.3, 870.34, 825.64, 572.4, 572.5, 825.22, 825.72; 455/41, 343, 31; 370/212, 242

(56) References Cited

U.S. PATENT DOCUMENTS

| 4,196,418 | * | 4/1980 | Kip et al. | .......................... 340/152 T |
| 4,590,440 | * | 5/1986 | Haque et al. | .......................... 331/17 |
| 5,345,231 | * | 9/1994 | Koo et al. | ....................... 340/825.31 |

* cited by examiner

Primary Examiner—Michael Horabik
Assistant Examiner—M. Shimizu

(57) ABSTRACT

A transponder (1) for the contactless communication with a base station (2) comprises an antenna resonant circuit (10) for receiving a modulated HF signal (5), signal processing means (13) for processing the modulated HF signal and for supplying a data signal (DS) and a clock signal (CLK), and data processing means (23) arranged to receive the data signal (DS) and the clock signal (CLK) and to process the data signal (DS), the clock signal (CLK) defining the processing speed of the data processing means (23) and the data processing means (23) being arranged to receive reset information (RI) for terminating the processing of the data signal (DS), the transponder (1) further comprising a frequency detector (31) arranged to receive the clock signal (CLK) and adapted to compare the frequency of the clock signal (CLK) with at least one limit frequency ($f_{G1}$) and to supply the reset information (RI) to the data processing means (23).

14 Claims, 2 Drawing Sheets

TRANSPONDER WITH A FREQUENCY DETECTOR FOR PROTECTION OF SECURITY-RELATED DATA DURING CONTACTLESS INDUCTIVE COMMUNICATION, AND AN INTEGRATED CIRCUIT THEREFOR

BACKGROUND OF THE INVENTION

The invention relates to a transponder for the contactless inductive communication with a base station, comprising an antenna resonant circuit adapted to receive a modulated HF signal supplied by the base station and to supply said signal to signal processing means, and signal processing means for processing a received modulated HF signal and for supplying a data signal and a clock signal, the data signal comprising data contained in the modulated HF signal and the frequency of the clock signal being derived from the frequency of the HF signal, and data processing means arranged to receive the data signal and the clock signal and adapted to process the data signal, the processing speed of the data processing means being dependent upon the clock signal and the data processing means being arranged to receive reset information for terminating the processing of the data signal.

The invention further relates to an integrated circuit for realizing a transponder constructed to provide contactless inductive communication with a base station, which transponder comprises an antenna resonant circuit adapted to receive a modulated HF signal supplied by the base station and to supply said signal to signal processing means, comprising signal processing means for processing a received modulated HF signal and for supplying a data signal and a clock signal, the data signal comprising data contained in the modulated HF signal and the frequency of the clock signal being derived from the frequency of the HF signal, and data processing means arranged to receive the data signal and the clock signal and adapted to process the data signal, the processing speed of the data processing means being dependent upon the clock signal and the data processing means being arranged to receive reset information for terminating the processing of the data signal.

Such a transponder of the type defined in the first paragraph and an integrated circuit of the type defined in the second paragraph are known, for example from the document U.S. Pat. No. 5,345,231 A. The known transponder comprises an antenna resonant circuit having an operational link with an antenna resonant circuit of a base station for the contactless inductive communication via a modulated HF signal. The modulated HF signal is generated by means of the base station and has an operating frequency.

The received modulated HF signal occurring in the antenna resonant circuit of the transponder during operation of the base station can be applied to a power supply stage, which derives a direct voltage for the power supply of the stages present in the transponder from the received HF signal. The power supply stage further includes a reset stage which supplies reset information to the stages in the transponder when said voltage drops below a minimum voltage which guarantees a reliable operation of the transponder, in order to terminate the operation of the transponder and thus the processing of a data signal.

In a reception mode of the transponder a received modulated HF signal occurs in the antenna resonant circuit of the transponder, which signal carries, in modulated form, digital data to be transmitted from the base station to the transponder. The modulated HF signal can be applied to signal processing means adapted to generate a clock signal having the frequency of the HF signal. The clock signal can be applied to data processing means formed by a microcomputer and defines the system clock and hence the processing speed in the data processing means, so that the processing speed of the data processing means depends on the clock signal.

Furthermore, the signal processing means are adapted to demodulate the received modulated HF signal and to supply a data signal to the data processing means. In a data processing mode the data processing means can process the digital data present in the data signal, after which the processed digital data can be stored in a memory, which can also result in data already stored in a memory being changed.

In a transmission mode of the transponder the digital data processed by the data processing means can be supplied as a data signal to the signal processing means. The signal processing means produce a load modulation of a non-modulated HF signal via the antenna resonant circuit of the transponder and an antenna resonant circuit of a base station, thereby enabling the digital data processed in the transponder to be transmitted inductively to the base station in a contactless manner.

The data which can be transmitted from the base station to the transponder and from the transponder to the base station and which can be stored in the memory of the transponder are nearly always security-related data, which represent for example amounts of money and which should be changed only by an authorized person. In the base station such security-related data are encoded by means of a digital key and after the transmission to the known transponder in the data processing means of this transponder they are decoded in the data processing means of this transponder by means of a digital key stored in a memory of the transponder, so that a high data security is achieved.

Owing to the recent development of new measurement technologies it has been found that by means of an intricate though possible measurement process applied to or in the transponder, in which an HF signal whose frequency is low in comparison with the operating frequency is transmitted to the transponder, as a result of which the data processing means have a comparatively low processing speed, security-related data which are available in non-encoded form in the transponder and which are transmitted between the data processing means and the memory of the transponder via an electrically conductive connection during this processing can be detected under certain circumstances with the aid of said electrically conductive connection. Such a measurement process can also be carried out without permission by persons who are not authorized to detect such security-related data. As a result of this recent development a desired high data security for security-related data is no longer attainable with a sufficient degree of reliability by means of the known transponder for contactless communication, which is an undesirable effect.

SUMMARY OF THE INVENTION

It is an object of the invention to preclude the aforementioned problems with a transponder of the type defined in the first paragraph and with an integrated circuit of the type defined in the second paragraph and to provide an improved transponder and an improved integrated circuit in which during a communication process between a transponder and a base station a high data security is achieved both during the transmission of security-related data between a transponder and a base station and during the processing of security-related data in the transponder.

According to the invention, to achieve this object in a transponder of the type defined in the first paragraph, the transponder comprises a frequency detector arranged to receive the clock signal, and the frequency detector is adapted to compare the frequency of the clock signal with at least one limit frequency, and the frequency detector is adapted to generate the reset information and to supply the reset information to the data processing means if the frequency of the clock signal is lower than the limit frequency.

In this way, it is achieved that the processing of data in the data processing means is terminated when the processing speed in the transponder decreases below a given value defined by the cut-off frequency of the frequency detector. Thus, security-related data transmitted between the data processing means and a memory of the transponder in accordance with the invention, such as for example the digital key itself but also any other security-related data, are only transmitted between the memory of the transponder and the data transmission means—via an electrically conductive connection between the memory and the data processing means—with such a high processing speed that a measurement process can be carried out on the afore-mentioned connection in order to detect security-related data but that such a measurement process is very unlikely to yield any useful measurement results.

In a transponder in accordance with the invention having the characteristic features defined in Claim 1 it has proved to be advantageous if, in addition, the measures defined in the dependent Claim 2 are taken. Thus, it is advantageously achieved that—if a given mode of operation in which security-related data are processed is active in the transponder—the frequency detector is adapted to define a limit frequency and, consequently, a special, i.e. high data security level for this given mode of operation is guaranteed in the transponder. For another mode of operation in which no security-related data are processed it is not necessary to define a limit frequency and hence a special, i.e. high data security level for the benefit of a stable and trouble-free communication in a wide frequency range. In a transponder in accordance with the invention, in which a plurality of different modes of operation can be activated, it is also possible to define different limit frequencies in these different modes of operation of the frequency detector, so that for each of these modes of operation a given data security level can be guaranteed in the transponder.

In a transponder in accordance with the invention having the characteristic features defined in Claim 2 it has proved to be advantageous if, in addition, the measures defined in the dependent Claim 3 are taken. Thus, it is advantageously achieved that when the transponder is active in the high-security mode, in which inter alias security-related data read from or to be read into a memory of the transponder are processed by the data processing means, a particularly high data security level defined by the second limit frequency is obtained, as a result of which a measurement process carried out on an electrically conductive connection between the data processing means and the memory of the transponder for the purpose of the unauthorized detection of said security-related data, does not yield any useful measurement results, so that it is substantially impossible to detect said security-related data and, consequently, a high data security is guaranteed. On the other hand, when in the transponder the security mode is active in which transponder is adapted to communicate with the base station and in which the security-related data are already available in encoded form in the transponder, a data security level is obtained which is defined by the first limit frequency and is lower than the data security level in the high-security mode but adequate for a desired data security, which has the advantage that substantially no limitations are imposed with respect to a lower processing speed of the data processing means or the type of modulation for the communication with the base station.

In a transponder in accordance with the invention having the characteristic features defined in Claim 3 it has proved to be advantageous if, in addition, the measures defined in the dependent Claim 4 are taken. Thus, it is advantageously achieved that when the security mode is active a communication of the transponder with the base station is possible using the highly noise-immune pulse-spacing coding of the HF signal carrying the data to be transmitted and that, in addition, a satisfactory data security level is guaranteed in the transponder during the communication. Moreover, since the first limit frequency is a frequency below the frequency of the fundamental wave of the pulse-spacing coded HF signal, it is achieved that the frequency detector does not generate reset information in spite of the fact that the frequency of the fundamental wave of the pulse-spacing coded HF signal also appears in the clock signal of the transponder. As a result of this, the processing of a data signal in the data processing means is not terminated either during the reception of a pulse-spacing coded HF signal by the transponder.

In a transponder in accordance with the invention having the characteristic features defined in Claim 4 it has proved to be advantageous if, in addition, the measures defined in the dependent Claim 5 are taken. Thus, it is advantageously achieved that when the transponder is active in the data security mode, in which the transponder is adapted to receive a pulse-spacing coded HF signal, the high-security mode, which assures a higher data security level than the security mode, is automatically activated in the transponder upon reception of the last data bits of a data sequence which are coded by a pulse spacing.

In a transponder in accordance with the invention having the characteristic features defined in Claim 4 it has proved to be advantageous if, in addition, the measures defined in the dependent Claim 6 are taken. Thus, it is advantageously achieved that when the transponder is active in the high-security mode, in which the transponder is adapted to process and also to transmit security-related data to a base station, the security mode, in which a pulse-spacing coded HF signal transmitted by a base station can be received, is automatically activated upon termination of the transmission in the transponder.

In a transponder in accordance with the invention having the characteristic features defined in Claim 1 it has proved to be advantageous if, in addition, the measures defined in the dependent Claim 7 are taken. Thus, it is advantageously achieved that in given time intervals, in which security-related data are processed and are then transferred from the memory of the transponder to the data processing means via an electrically conductive connection or from the data processing means to the memory via an electrically conductive connection, the high-security mode can be activated by the data processing means and upon termination of the processing of the security-related data the data processing means are adapted to activate the security mode. This has the advantage that in each case the data processing means can define the data security level necessary for processing. Moreover, as a result of the activation of the high-security mode by the data processing means, the total time in which the high-security mode is active in the transponder can be short, so that the transponder operates for long periods in the security mode in which a stable and trouble-free communication in a wide frequency range is possible. The measures in accordance with the dependent Claim 7 can also be applied advantageously in the transponders defined in the dependent Claims 2 to 6.

According to the invention, to achieve the aforementioned object in an integrated circuit of the type defined in the second paragraph, the integrated circuit comprises a frequency detector arranged to receive the clock signal, and the frequency detector is adapted to compare the frequency of the clock signal with at least one limit frequency, and the frequency detector is adapted to generate the reset information and to supply the reset information to the data processing means if the frequency of the clock signal is lower than the limit frequency.

In this way, such an integrated circuit in accordance with the invention has advantages corresponding to the advantages set forth hereinbefore in relation to a transponder as defined in Claim 1.

The advantageous variants of an integrated circuit having the characteristic features defined in Claims 9 to 14 have advantages corresponding to the advantages set forth hereinbefore in relation to the advantageous variants of a transponder in accordance with the invention, which variants have the characteristic features defined in Claims 2 to 7.

The above-mentioned as well as further aspects of the invention will become apparent from the embodiments described hereinafter by way of examples and will be elucidated with reference to these embodiments.

BRIEF DESCRIPTION OF THE DRAWINGS

The invention will now be described in more detail with reference to an embodiment which is shown in the Figures but to which the invention is not limited.

DETAILED DESCRIPTION OF THE PREFERRED EMBODIMENTS

Figure 1:
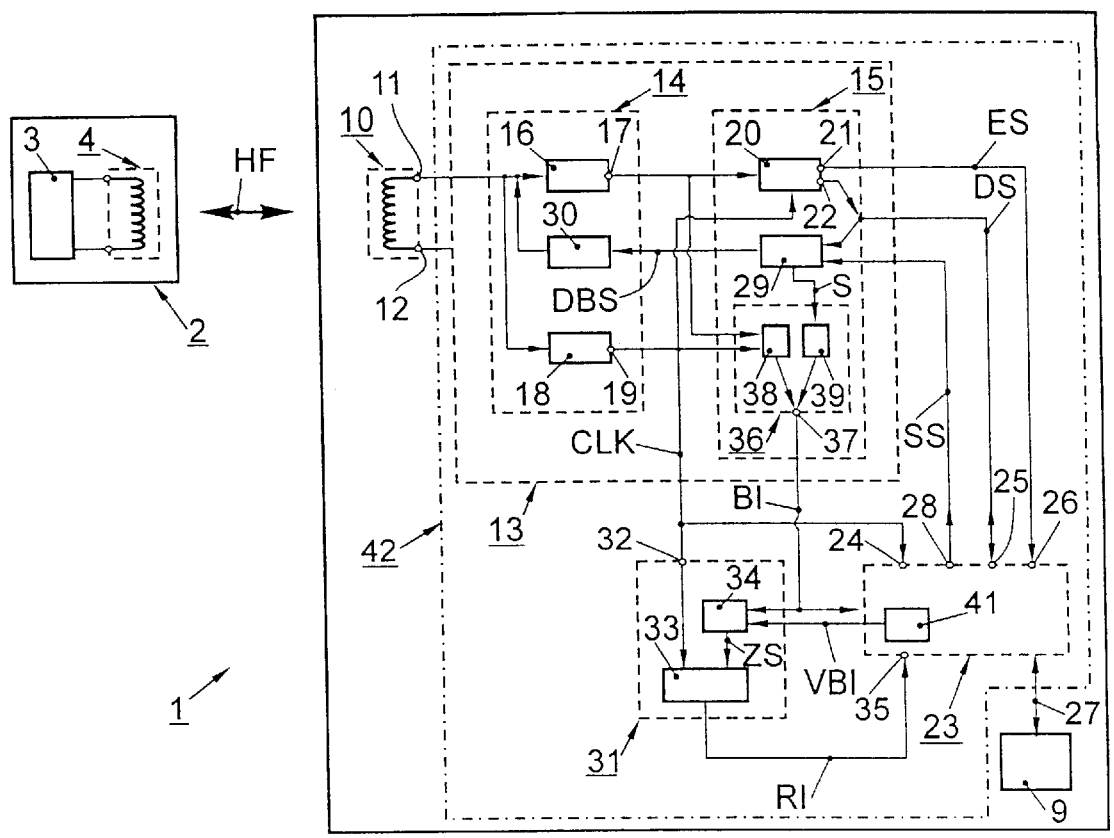
FIG. 1 shows diagrammatically, in the form of a block diagram, a transponder in accordance with the invention for the contactless inductive communication with a base station which is also shown diagrammatically, in the form of a block diagram, in FIG. 1.

FIG. 1 shows a transponder 1 for the contactless inductive communication with a base station 2. The base station 2 comprises processing means 3 and an antenna resonant circuit 4. The processing means 3 can generate an HF signal which can be modulated with digital data to be transmitted to the transponder 1, as is generally known. For the modulation of the HF signal use is made of pulse-spacing coding, which is particularly stable and immune to interference.

Figure 2:
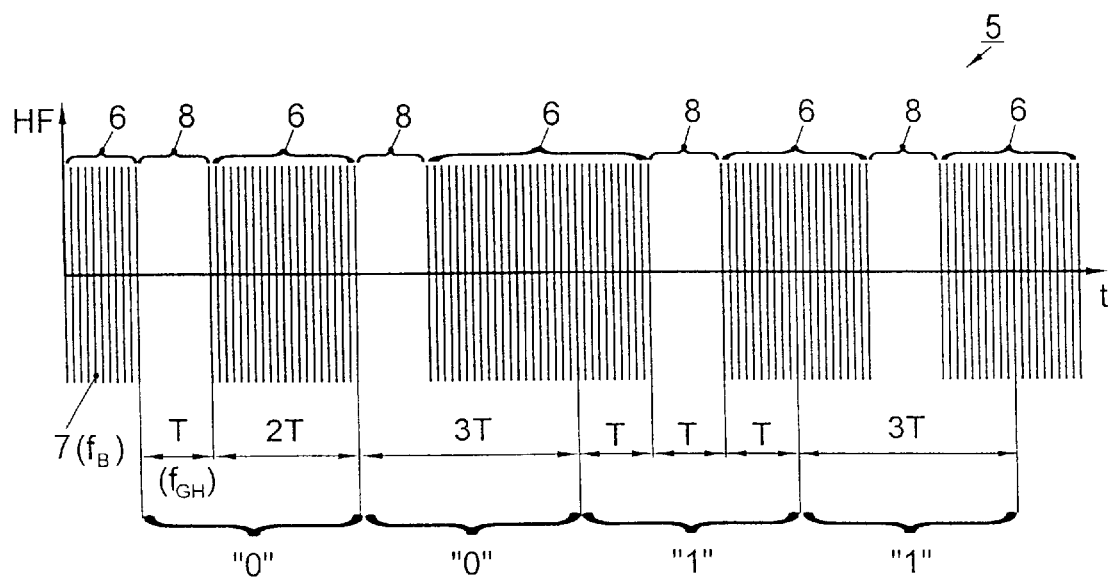
FIG. 2 shows a signal waveform of a pulse-spacing coded HF signal which occurs in an antenna resonant circuit of the transponder during communication of the transponder of FIG. 1 with the base station.

FIG. 2 shows a signal waveform of a pulse-spacing coded HF signal 5. The HF signal 5 has signal portions 6 where the HF signal is formed by a carrier signal 7, which carrier signal 7 has an operating frequency $f_B$. The HF signal 5 has further signal portions 8 where the carrier signal 7 is practically absent and which each form a pulse spacing. A "0" data bit is coded by a sequence of a further signal portion 8 of the length T and a signal portion 6 of the length 2T. A "1" data bit is coded by a sequence of a further portion 6 of the length T, a further signal portion 8 of the length T and another signal portion 6 of the length T. Both a "0" data bit and a "1" data bit are coded in a data bit length of 3T.

The pulse-spacing coded HF signal 5 has a fundamental wave or first harmonic whose frequency $f_{GH}$ essentially complies with the equation $f_{GH}=1/T$. The fundamental wave is then the a.c. component of the lowest frequency of the pulse-spacing coded HF signal 5, whose amplitude has a value suitable for practical purposes. A non-modulated HF signal is wholly formed by signal portions 6, i.e. by the carrier signal 7. The fundamental wave of a non-modulated HF signal consequently has the operating frequency $f_B$ of the carrier signal 7.

The processing means 3 of the base station 2 are further adapted to encode security-related data with a first digital key formed by a data code. Security-related can be, for example, data representing amounts of money or data which give access authorization to an area space to be accessed only by authorized persons. A memory 9 of the transponder 1 stores a second digital key corresponding to the first digital key and enabling the security-related data encoded in the base station 2 to be decoded in the transponder 1. Encoding security-related data by means of a digital key has been known for a long time. For example, it is possible to use a so-called symmetrical coding, in which case the first digital key and the second digital key are the same, or alternatively to use a so-called asymmetrical coding, in which case the two digital keys are different.

In a transmission mode of the base station 2 a pulse-spacing coded HF signal 5 can be supplied from the processing means 3 to the antenna resonant circuit 4 of the base station 2. The transponder 3 also has an antenna resonant circuit 10 which—when the transponder 1 is within the receiving range of the base station 2—is inductively coupled to the antenna resonant circuit 4 of the base station 2. By means of the antenna resonant circuit of the transponder 1 it is possible to receive a modulated HF signal 5 supplied by the antenna resonant circuit 4 of the base station 2.

In a reception mode of the transponder 1 an HF signal 5 appearing in the antenna resonant circuit 10 can be supplied from an antenna terminal 11 and from a further antenna terminal 12 of the antenna resonant circuit 10 to signal processing means 13. The signal processing means 13 are adapted to process the modulated HF signal and to supply a data signal DS and a clock signal CLK, the data signal DS comprising or containing the data present in the modulated HF signal 5 and the frequency of the clock signal CLK being derived from the operating frequency $f_B$ of the carrier signal 7 present in the HF signal 5. For this purpose, the signal processing means 13 include a signal preparation stage 14 and a processing stage 15.

The signal preparation stage 14 comprises an analog processing stage 16 connected to the antenna resonant circuit 10 and arranged to receive an HF signal 5 appearing in the antenna resonant circuit 10. The analog processing stage 16 includes filter stages and amplifier stages to enhance the signal-to-noise ratio of the HF signal 5, which filter stages and amplifier stages are not shown in FIG. 1. An HF signal 5 processed in the analog processing stage 16 is available on an output 17 of the analog processing stage 16.

The signal preparation stage 14 further comprises a clock generator stage 18 connected to the terminal 11 of the antenna resonant circuit 10 and arranged to receive an HF signal 5 supplied to the terminal 11. The clock generator stage 18 is adapted to generate the clock signal CLK. When the transponder 1 is in the reception mode and a pulse-spacing coded HF signal 5 is applied to the clock generator stage 18, the clock signal CLK drops out for a time interval T when the pulse-spacing coded HF signal exhibits a pulse spacing of a length T. Thus, when the transponder 1 is in the reception mode the fundamental wave of the pulse-spacing coded HF signal 5 also appears in the clock signal CLK. The clock signal CLK generated in the clock generator stage 18 is available on a clock signal output 19 of the clock signal generator stage 18.

The processing stage 15 has a demodulator stage 20 connected to the output 17 of the analog processing stage 16. The processed HF signal appearing on the output 17 can be applied to the demodulator stage 20, which signal successively comprises the carrier signal 7 in signal portions 6 and pulse spacings in signal portions 8. The demodulator stage 20 is further arranged to receive the clock signal CLK appearing on the clock signal output 19 of the clock generation stage 18. The demodulator stage 20 is adapted to detect data bits and store these in a buffer memory of the demodulator stage 20, which is effected by means of the clock signal CLK by detection of the instants at which pulse spacings appear in the processed HF signal, using the coding described with reference to FIG. 2. When a given number of data bits are stored in the buffer memory of the demodulator stage 20 the demodulator stage 20 is adapted to generate a reception control signal ES and to supply this reception control signal ES to a control output 21. In the present case the demodulator stage 20 is further adapted to supply the data bits stored in the buffer memory to a data bit connector 22 of the demodulator stage 20, which data bit connector 22 has eight connector contacts.

The transponder 1 further includes data processing means 23 formed by a microcomputer and adapted to process the data signal DS in a data processing mode of the transponder 1. For this purpose, the data processing means 23 have a clock signal input 24 connected to the clock signal output 19 of the clock generator stage 18, which clock signal input 24 of the data processing means 23 is arranged to receive the clock signal CLK. The clock signal CLK then forms the system clock in the data processing means 23 formed by a microcomputer and thus defines the processing speed of the data processing means 23.

The data processing means 23 include a further data bit connector 25, which also has eight connector contacts and is connected to the data bit connector 22 of the processing stage 15 via a data bus having eight electrically conductive connections. The data processing means 23 further have a control input 26 connected to the control output 21 of the demodulator stage 20 and arranged to receive the reception control signal ES from the demodulator stage 20. When the reception control signal ES appears the data processing means 23 are adapted to read out the data bits forming the data signal DS and available on the data bit connector 22.

The data bits read out by the data processing means 23 in the data processing mode correspond to the encoded security-related data transmitted from the base station 2 to the transponder 1. The data processing means 23 are connected to the memory 9, which stores the second digital key, via an electrically conductive connection 27. The second digital key can be transferred from the memory 9 to the data processing means 23 via the connection 27 to decode the encoded security-related data transmitted to the transponder 1. The second digital key, which is formed by a digital data code, corresponds to the first digital key by means of which the security-related data have been encoded in the base station 2. The processing means 23 are adapted to decode the encoded security-related data by means of the second digital key.

In an application of the transponder 1 in accordance with the invention the base station 2 forms an automatic cash dispenser 2 of a bank and the transponder 1 forms an IC card for contactless inductive communication, to which card amounts of money can be transferred electronically to allow subsequent payment in a shop by means of the IC card. In this application an amount of money is represented by the decoded security-related data which can be transferred from the data processing means 23 to the memory 9 via the connection 27 and can be loaded into the memory 9.

In the data processing mode of the transponder 1 security-related data processed by the data processing means 23 can be encoded by the data processing 23 with the aid of the second digital key transmitted from the memory 9 to the data processing means 23 via the connection 27 and can be transferred to the further data bit connector 25 of the data processing means 23 in order to prepare these data for a transmission mode of the transponder 1. The data processing means 23 are further adapted to generate a transmission control signal SS and to apply this transmission control signal SS to a control output 28 of the data processing means 23.

The processing stage 15 of the signal processing means 13 includes a transmission signal preparation stage 29 arranged to receive the transmission control signal SS from the control output 28 of the data processing means 23. When a transmission control signal SS appears a data signal DS can be applied to the transmission signal preparation stage 29, which data signal is formed by the data bits applied to the further data bit connector 25 of the data processing means 23. The transmission signal preparation stage 29 is adapted to process the applied data bits into a serial data bit signal DBS. The serial data bit signal DBS can be applied to a modulator stage 30 of the signal preparation stage 14. The modulator stage 30 is adapted to load the antenna resonant circuit 10 in accordance with the received serial data bit signal DBS, which has been known for a long time as so-called load modulation. When the transponder 1 is within the receiving range of the base station 2 said load modulation induces a load-modulated HF signal in the antenna resonant circuit 4 of the base station 2. The load-modulated HF signal produced in the antenna resonant circuit 4 can be supplied from the antenna resonant circuit 4 to the processing means 3, in which processing means 3 it can be demodulated and decoded by means of the first digital key.

The transponder 1 now comprises a frequency detector 31 having a clock signal input 32 arranged to receive the clock signal CLK from the clock signal output 19 of the clock generator stage 18. The frequency detector 31 comprises a comparator stage 33 arranged to receive the clock signal CLK from the clock signal input 32 of the frequency detector 31.

The frequency detector 31 further comprises a time-base stage 34 adapted to supply a time-base signal ZS to the comparator stage 33, which time base signal ZS has a first limit frequency $f_{G1}$. The comparator stage 33 is adapted to compare the frequency of the clock signal CLK with the first limit frequency $f_{G1}$, of the time base signal ZS and to supply reset information RI when the frequency of the clock signal CLK is lower than the first limit frequency $f_{G1}$. The reset information RI can be applied from the comparator stage 33 of the frequency detector 31 to a rest input 35 of the data processing means 23. When reset information RI occurs the data processing means 23 are adapted to terminate the processing of the data signal DS. When the frequency detector 31 stops the supply of reset information RI to the data processing means 23 the data processing means 23 are adapted to initiate the processing of the data signal DS starting from an initial state, as is customary in microcomputers upon resetting of the microcomputer.

This has the advantage that the processing of the data signal DS by the processing means 23 is terminated when to the antenna resonant circuit 10 of the transponder 1 an HF signal is supplied whose fundamental wave has a frequency below the first limit frequency $f_{G1}$ defined in the frequency detector 31. Consequently, a measurement process carried out on the connection 27 in order to detect non-decoded security-related data transmitted via the connection 27 between the data processing means 23 and the memory 9 is very unlikely to yield any useful measurement results. In this way, the data security during a communication process between the transponder 1 in accordance with the invention and the base station 2 is improved substantially.

The processing stage 15 of the signal processing means 13 comprises a mode stage 36 adapted to generate and supply several different mode information signals on a mode output 37 and thereby activate several modes of operation in the transponder 1. The mode information signals BI which characterize the reception mode, the data processing mode, the transmission mode and further modes of operation, can be applied from the mode output 37 to the data processing means 23 and to the time base stage 34 of the frequency detector 31. The data processing stage 23 is adapted to activate the processing of a data signal in the data processing means 23 in accordance with the instantaneous mode of operation when mode information BI occurs. The time base stage 34 of the frequency detector 31 is adapted to define at least one limit frequency in dependence upon the activated mode of operation when mode information BI occurs. This has the advantage that the frequency detector 31 is adapted to defines the limit frequency in the data processing mode, in which security-related data are processed, and consequently a very high data security level is guaranteed in the transponder 1 when the data processing mode is active. In other modes in which no security-related data are processed it is not necessary to define a limit frequency in the frequency detector 31 and to guarantee a particularly high data security level, for the benefit of a stable and trouble-free communication in a wide frequency range.

The mode stage 36 is adapted to activate a security mode in the transponder 1, in which the transponder 1 is adapted to receive a modulated HF signal 5. The security mode corresponds to the afore-mentioned reception mode but in the security mode, in addition, the data security level in the transponder 1 has been defined by defining a first limit frequency $f_{G1}$ in the frequency detector 31. The mode stage 36 is further adapted to activate a high-security mode in the transponder 1, in which the transponder 1 is adapted to process security-related data. The high-security mode corresponds to the afore-mentioned data processing mode and, if applicable, also to the transmission mode but, in addition, a given very high data security level is guaranteed in the high-security mode in that a second limit frequency $f_{G2}$ has been defined in the frequency detector 31. This has the advantage that security-related are processed only in the high-security mode, in which a particularly high data security level in the transponder 1 is guaranteed. However, the data security level is also satisfactory in the security mode of the transponder 1.

In the security mode, in which the signal processing means 13 are adapted to process a pulse-spacing coded HF signal 5 received in the antenna resonant circuit 10, the frequency detector 31 is adapted to define the first limit frequency $f_{G1}$ at a frequency lower than the frequency of the fundamental wave of the pulse-spacing coded HF signal 5. This has the advantage that the frequency detector 31 generates reset information RI only at a frequency of the clock signal CLK below the frequency of the fundamental wave of the pulse-spacing coded HF signal 5, which also appears in the clock signal CLK. Thus, it is avoided that when a pulse-spacing coded HF signal 5 is received the frequency detector 31 generates reset information RI and the data processing means 23 are consequently reset to an initial state.

The mode stage 36 further includes a timing stage 38 which is arranged to receive the processed HF signal from the output 17 of the analog processing stage 16 as well as the clock signal CLK from the clock signal output 19. The timing stage 38 is adapted to detect a pulse spacing in the processed HF signal. By means of the clock signal CLK applied to the timing stage 38 this stage 38 is also adapted to define a time interval $T_T$ and to supply mode switching information, which forms mode information BI, if no further pulse spacing occurs in the HF signal during the time interval $T_T$. When the transponder 1 is in the security mode the mode stage 36 is adapted to activate the high-security mode in the transponder 1 by supplying the mode switching information. This has the advantage that in the security mode of the transponder 1 the high-security mode is automatically activated in the transponder 1 after reception of the last pulse-spacing coded data bits in the transponder 1, as a result of which a higher data security level than in the security mode is guaranteed.

The mode stage 36 includes a reset stage 39 which is arranged to receive a control signal S from the signal preparation stage 29, which control signal S characterizes the end of the transmission mode when all the data to be transmitted to the base station have been transmitted. The reset stage 39 is adapted to supply mode information BI formed by mode switching information to the frequency detector 31 when the transponder 1 is in the high-security mode and a control signal S appears. This has the advantage that immediately after the last data bits have been transmitted, during which transmission the high-security mode which guarantees a particularly high data security level is active, the security mode is activated in the transponder 1, which guarantees a satisfactory reception of a pulse-spacing coded HF signal 5. Thus, the high-security mode of the transponder 1 is activated only when this is strictly necessary for the processing of security-related data. Owing to the automatic activation of the security mode by the reset stage 39 the transponder 1 is again ready to receive a pulse-spacing coded HF signal 5 subsequent to the high-security mode.

Figure 3:
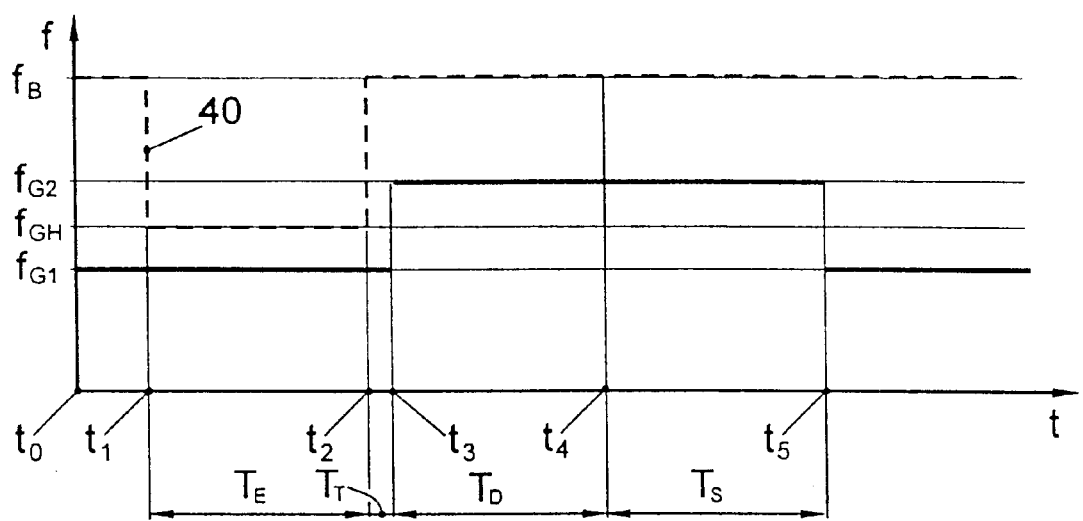
FIG. 3 represents frequency values of the fundamental wave of a non-modulated and a pulse-spacing coded HF signal—which frequency values also appear in the clock signal which occurs in the transponder of FIG. 1 when it receives such a pulse-spacing coded HF signal in certain time intervals—as well as frequency values of limit frequencies defined by a frequency detector of the transponder of FIG. 1.

FIG. 3 represents frequency values of the fundamental wave of a non-modulated and a pulse-spacing coded HF signal, which frequency values also appear in the clock signal CLK which occurs in the transponder of FIG. 1 when the transponder 1 receives such a pulse-spacing coded HF signal in certain time intervals. These frequency values are shown as a broken line 40.

As is shown in FIG. 3, it has been assumed that at an instant $t_0$, at which the transponder 1 is in the security mode and, consequently, the frequency detector 31 defines the first limit frequency $f_{G1}$, the transponder 1 receives a non-modulated HF signal. The frequency of the fundamental wave of the non-modulated HF signal corresponds to the operating frequency $f_B$ of the carrier signal 7. It has further been assumed that starting from an instant $t_1$ the transponder 1 receives a pulse-spacing coded HF signal 5 during a time $T_E$ which has a fundamental wave of a frequency $f_{GH}$, which fundamental wave—as already explained—also occurs in the clock signal CLK. It has also been assumed that the timing stage 38 of the mode stage 36 detects the last pulse spacing in the pulse-spacing coded HF signal 5 at an instant $t_2$, which HF signal 5 changes to a non-modulated HF signal. Moreover, it has been assumed that after expiry of a time $T_T$ after the appearance of the last pulse spacing in the pulse-spacing coded HF signal 5 the timing stage 38 supplies mode information BI, formed by mode switching information, to the frequency detector 31 at the instant $t_1$ in order to define the second limit frequency $f_{G2}$. As a result of this, the transponder 1 is set to the high-security mode at the instant $t_3$. Furthermore, it has been assumed that during a subsequent time interval $T_D$ the data processing means 23 process security-related data and that in a subsequent time interval $T_S$ starting at an instant $t_4$ security-related data are transmitted from the transponder 1 to the base station 2.

The transmission signal preparation stage 29 is adapted to supply the control signal S to the reset stage 39 when the transponder 1 has transmitted the last data bit to the base station 2, which reset stage 39 is adapted to generate and supply mode information BI formed by mode switching information to the frequency detector 31. The frequency detector 31 is adapted to define the first limit frequency $G_1$ when such mode information BI appears and the transponder 1 is again in the security mode.

As is apparent from FIG. 3, the processing of security-related data in the data processing means 23 is stopped if in the time interval $T_D$ and in the time interval $T_S$, in which the transponder 1 is in the high-security mode, an HF signal, whose fundamental wave has a frequency below the second limit frequency $f_{G2}$, is transmitted to the transponder 1. As a result of this, a particularly high data security is obtained in the transponder 1.

It is to be noted that in the transmission mode, in which the security-related data are already encoded, the high-security mode need not be activated but it is alternatively possible that only the security mode is active if this is adequate and desired.

For a further improvement of the adaptation of the prevailing data security level to the instantaneous processing mode in the transponder 1 the data processing means 23 of the transponder 1 include a further mode stage 41, which is adapted to activate the security mode and the high-security mode in the transponder 1. For this purpose, the further mode stage 41 is adapted to generate and supply processing mode information VBI to the time base stage 34 of the frequency detector 31. The time base stage 34 of the frequency detector 31 is adapted to define a first limit frequency $f_{G1}$ when processing mode information appears and the security mode is active, and to define a second limit frequency $fG_2$ when processing mode information VBI appears and the high-security mode is active, the second limit frequency $f_{G2}$ being higher than the first limit frequency $f_{G1}$. This provides the advantage that in given time intervals in which security-related data are transmitted via the connection 27 or a further electrically conductive connection of the transponder 1 the data processing means 23 can activate the high-security mode and the data processing means 23 are adapted to activate the security mode immediately after completion of the processing of the security-related data. This has the advantage that the further mode stage 41 of the data processing stage 23 can define the data security level required for the instantaneous processing mode.

It is to be noted that the transponder 1 shown in FIG. 1 is realized by means of an integrated circuit 42, represented diagrammatically by means of dashed lines in FIG. 1. The memory 9 is connected to the integrated circuit 42 via the electrically conductive connection 27. It is emphasized that the memory 9 can be incorporated in the integrated circuit 42.

It is to be noted that the measures in accordance with the invention can be implemented not only in a so-called passive transponder 1 as shown in FIG. 1, but also in a so-called active transponder having a battery for the power supply of the transponder.

Moreover, it is to be noted that the frequency detector of the transponder 1 shown in FIG. 1 can also be adapted to define further limit frequencies so as to provide an arbitrary number of data security levels in the transponder 1.

Instead of a pulse-spacing coding of the non-modulated HF signal as in the embodiment described above by way of example, it is alternatively possible to use, for example, pulse-width coding.

What is claimed is:

1. A transponder for the contactless inductive communication with a base station, comprising:
    an antenna resonant circuit adapted to receive a modulated HF signal supplied by the base station;
    signal processing means for processing the received modulated HF signal from the antenna resonant circuit and for supplying a data signal and a clock signal, the data signal comprising data contained in the modulated HF signal and the frequency of the clock signal being derived from the frequency of the HF signal;
    data processing means arranged to receive the data signal and the clock signal and adapted to process the data signal, the processing speed of the data processing means being dependent upon the clock signal and the data processing means being arranged to receive reset information for terminating the processing of the data signal,
    a frequency detector arranged to receive the clock signal, to compare the frequency of the clock signal with at least a first limit frequency and to generate the reset information and to supply the reset information to the data processing means if the frequency of the clock signal is lower than the limit frequency;
    wherein the transponder is adapted to activate a high-security mode during which the transponder processes security-related data and a second limit frequency that is higher than the first limit frequency is defined by the frequency detector.

2. A transponder as claimed in claim 1, wherein the signal processing means include a mode stage adapted to activate at least a security mode and the high-security mode in the transponder, and the signal processing means are adapted to process the security-related data when the high-security mode is active, and the frequency detector is adapted to define the first limit frequency when the security mode is active.

3. A transponder as claimed in claim 1, wherein the signal processing means are adapted to process a pulse-spacing coded HF signal received by means of the antenna resonant circuit, and the frequency detector defines a frequency which is lower than the frequency of the fundamental wave of the pulse-spacing coded HF signal as the first limit frequency.

4. A transponder as claimed in claim 3, including a timing state which is adapted to generate mode switching information and by means of which such mode switching information can be generated a given time interval after the occurrence of a last pulse spacing detected in a pulse-spacing coded HF signal, and the high-security mode is activated when the security mode is active in the transponder and the mode switching information occurs.

5. A transponder as claimed in claim 4, including a reset stage adapted to generate further mode switching information in dependence upon the termination of a transmission mode of the transponder, and the the security mode is activated when the high-security mode is active and the further mode switching information occurs.

6. A transponder as claimed in claim 1, wherein the data processing means include a mode stage adapted to activate a security mode and the high-security mode in the transponder, and the data processing means are adapted to process the security-related data when the high-security mode is active, and the frequency detector is adapted to define the first limit frequency when the security mode is active.

7. An integrated circuit for a transponder constructed to provide contactless inductive communication with a base station, wherein the transponder comprises an antenna resonant circuit adapted to receive a modulated HF signal supplied by the base station and to supply said signal to signal processing means, the integrated circuit comprising:

signal processing means for processing a received modulated HF signal and for supplying a data signal and a clock signal, the data signal comprising data contained in the modulated HF signal and the frequency of the clock signal being derived from the frequency of the HF signal, data processing means arranged to receive the data signal and the clock signal and adapted to process the data signal, the processing speed of the data processing means being dependent upon the clock signal and the data processing means being arranged to receive reset information for terminating the processing of the data signal, a frequency detector arranged to receive the clock signal, to compare the frequency of the clock signal with at least a first limit frequency and to generate the reset information and to supply the reset information to the data processing means if the frequency of the clock signal is lower than the limit frequency;

wherein the integrated circuit is adapted to activate a high-security mode in the transponder during which the transponder processes security-related data and a second limit frequency that is higher than the first limit frequency is defined by the frequency detector.

8. An integrated circuit as claimed in claim 7, wherein the signal processing means include a mode stage adapted to activate at least a security mode and the high-security mode in the transponder, and the signal processing means are adapted to process the security-related data when the high-security mode is active, and the frequency detector is adapted to define the first limit frequency when the security mode is active.

9. An integrated circuit as claimed in claim 7, wherein the signal processing means are adapted to process a pulse-spacing coded HF signal received by means of the antenna resonant circuit, and the frequency detector defines a frequency lower than the frequency of the fundamental wave of the pulse-spacing coded HF signal as the first limit frequency.

10. An integrated circuit as claimed in claim 9, including a timing state which is adapted to generate mode switching information and by means of which such mode switching information can be generated a given time interval after the occurrence of a last pulse spacing detected in a pulse-spacing coded HF signal, and the high-security mode is activated when the security mode is active in the transponder and the mode switching information occurs.

11. An integrated circuit as claimed in claim 10, including a reset stage adapted to generate further mode switching information in dependence upon the termination of a transmission mode of the transponder, and the the security mode is activated when the high-security mode is active and the further mode switching information occurs.

12. An integrated circuit as claimed in claim 7, wherein the data processing means include a mode stage adapted to activate a security mode and the high-security mode in the transponder, and the data processing means are adapted to process the security-related data when the high-security mode is active, and the frequency detector is adapted to define the first limit frequency when the security mode is active.

13. transponder for the contactless inductive communication with a base station, comprising:

an antenna resonant circuit adapted to receive a modulated HF signal supplied by the base station;

signal processing means for processing the received modulated HF signal from the antenna resonant circuit and for supplying a data signal and a clock signal, the data signal comprising data contained in the modulated HF signal and the frequency of the clock signal being derived from the frequency of the HF signal;

data processing means arranged to receive the data signal and the clock signal and adapted to process the data signal, the processing speed of the data processing means being dependent upon the clock signal and the data processing means being arranged to receive reset information for terminating the processing of the data signal, a frequency detector arranged to receive the clock signal, to compare the frequency of the clock signal with at least a first limit frequency and to generate the reset information and to supply the reset information to the data processing means so as to terminate the processing of the data signal by the data processing means if the frequency of the clock signal is lower than the limit frequency.

14. An integrated circuit for a transponder constructed to provide contactless inductive communication with a base station, wherein the transponder comprises an antenna resonant circuit adapted to receive a modulated HF signal supplied by the base station and to supply said signal to signal processing means, the integrated circuit comprising:

signal processing means for processing a received modulated HF signal and for supplying a data signal and a clock signal, the data signal comprising data contained in the modulated HF signal and the frequency of the clock signal being derived from the frequency of the HF signal, data processing means arranged to receive the data signal and the clock signal and adapted to process the data signal, the processing speed of the data processing means being dependent upon the clock signal and the data processing means being arranged to receive reset information for terminating the processing of the data signal, a frequency detector arranged to receive the clock signal, to compare the frequency of the clock signal with at least a first limit frequency and to generate the reset information and to supply the reset information to the data processing means so as to terminate the processing of the data signal by the data processing means if the frequency of the clock signal is lower than the limit frequency.

* * * * *